Feb. 22, 1966 M. L. ROBINSON 3,236,759
OXIDANT SENSOR
Filed March 14, 1962 3 Sheets-Sheet 1

INVENTOR.
MYRON L. ROBINSON
BY Christie, Parker & Hale
ATTORNEYS.

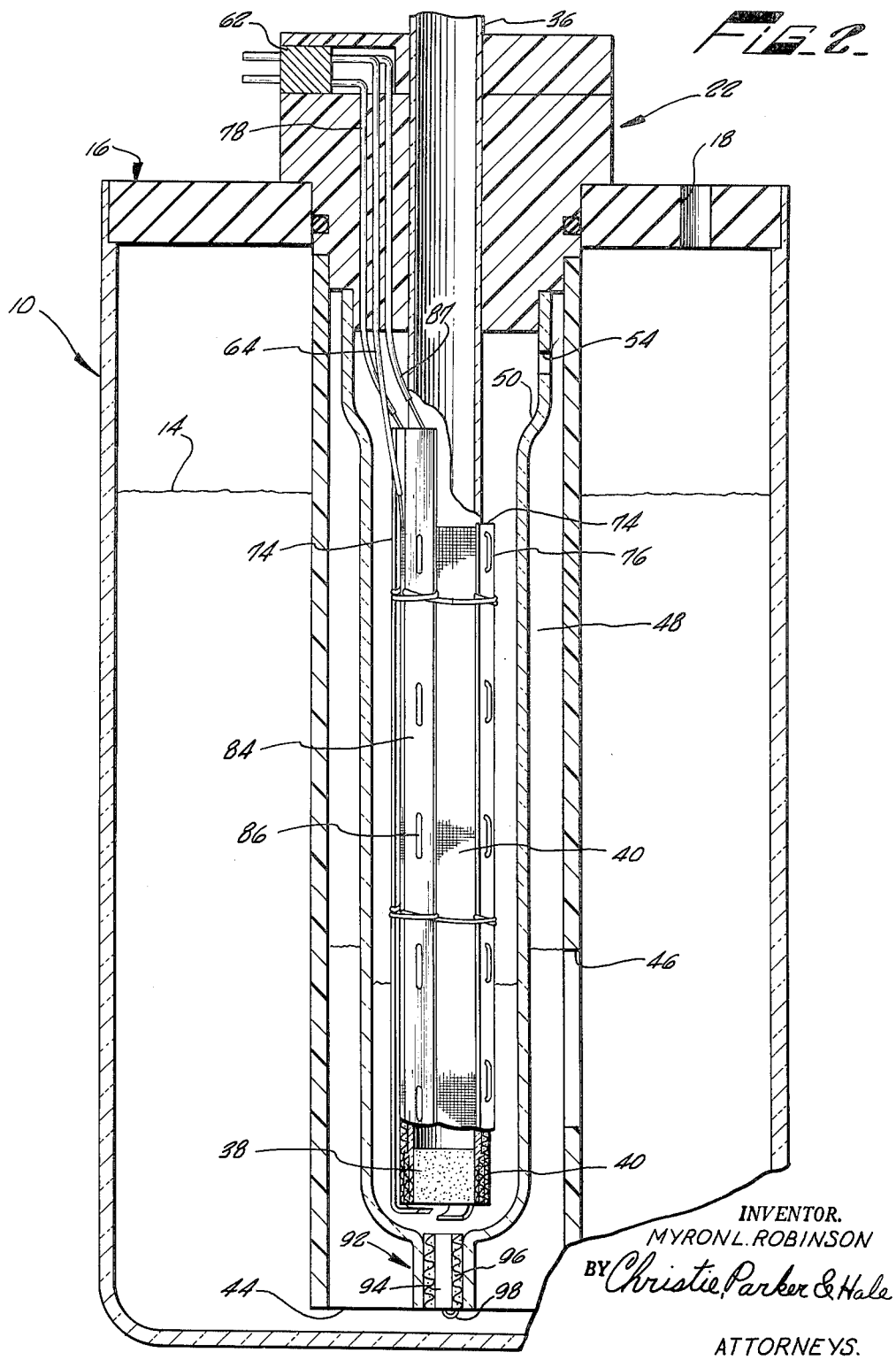

Feb. 22, 1966 M. L. ROBINSON 3,236,759
OXIDANT SENSOR
Filed March 14, 1962 3 Sheets-Sheet 3

INVENTOR.
MYRON L. ROBINSON
BY Christie, Parker & Hale
ATTORNEYS.

United States Patent Office 3,236,759
Patented Feb. 22, 1966

3,236,759
OXIDANT SENSOR
Myron L. Robinson, Monterey Park, Calif., assignor, by mesne assignments, to International Telephone and Telegraph Corporation, New York, N.Y., a corporation of Maryland
Filed Mar. 14, 1962, Ser. No. 179,644
7 Claims. (Cl. 204—195)

This invention is directed to improvements in apparatus for sensing the amount of an oxidant present in a test fluid and more particularly to an improved oxidant sensor employing a novel polarized electrode cell design.

In industrial plants which produce oxidants for commercial use, as well as in many commercial and military installations handling oxidants, it is necessary to provide means for sensing the amount of an oxidant present in a given fluid. This is particularly true where the oxidant itself is dangerous to human health. Presently available apparatus for sensing oxidants, however, generally possess a relatively small range of sensitivity, are insensitive to rapid changes in oxidant concentration, and are complex, bulky and expensive.

In view of the above the present invention provides a relatively inexpensive oxidant sensor having a simple, highly compact, yet rugged design which is responsive, in a linear manner, to rapid changes in the amount of an oxidant present in a test fluid over a range extending approximately from two one-hundredths part per million to pure oxidant.

Briefly, in accomplishing this, the present invention basically includes means for bubbling a fluid containing unknown amounts of an oxidant along a predetermined fluid path through an electrolytic solution. Positioned along the predetermined fluid path is a primary electrode. Electrically coupled to the primary electrode at a point external to the solution is a secondary electrode. The secondary electrode is also located in the electrolytic solution to complete an electrical circuit between the primary and secondary electrode. Due to this circuit connection, the primary electrode acts as a cathode and the secondary electrode as an anode to develop a voltage just sufficient to polarize the primary electrode, as by the formation of a film of hydrogen thereon. The polarization of the primary electrode prohibits current flow between the electrodes. However, when the fluid being bubbled along the fluid path contains an oxidant the primary electrode is depolarized and a current is allowed to flow between the electrodes in direct proportion to the amount of oxidant present in the fluid.

To maintain this direct proportionality over a wide range of oxidant concentration with a sensor which is simple, compact and inexpensive and rapidly responsive to changes in oxidant concentration, the present invention, in a preferred form, includes a container in which there is disposed an electrolytic solution containing halide ions. Extending downward into the solution is a tubular member. The lower end of the tubular member is enclosed by a porous bubbler. Wrapped around the bubbler and extending upward along the outer surface of the tubular member is a wire mesh composed of a noble metal, such as platinum. The wire mesh acts as the primary electrode. Also extending along the surface of the tubular member and spaced from the wire mesh is the secondary electrode. Preferably, the secondary electrode takes the form of a strip of an active metal, such as silver, which is looped under the bubbler to extend upwardly on either side of the tubular member. The secondary electrode is electrically coupled to the primary electrode at a point external to the container. At the secondary electrode the halide ions chemically react with the active metal to form a metal salt and liberate electrons which travel through the electrical circuit to the wire mesh. At the wire mesh the electrons combine with hydrogen ions in the solution to polarize the primary electrode as by the formation of a film or hydrogen on the primary electrode. Due to the polarization of the primary electrode current is prevented from flowing between the primary and secondary electrodes.

When a fluid containing an oxidant, such as nitrogen dioxide, is directed downward through the tubular member to oxidant reacts with the halide ions within the bubbler to form the halogen. The halogen and the fluid, in diffusing from the bubbler, comes into contact with the wire mesh and foams upward along the outer surface of the tubular member in contact with the primary and secondary electrodes. In this manner the predetermined fluid path is defined.

At the primary electrode the halogen acts to depolarize the primary electrode. Current is then free to flow between the primary and the secondary electrodes. This current is directly proportional to the amount of halogen developed to depolarize the primary electrode and is hence directly proportional to the amount of oxidant present in the fluid which has reacted substantially to completion with the halide ions within the bubbler and adjacent thereto. Thus, by metering the current flowing between the primary and secondary electrodes, means are provided for directly indicating the amount of oxidant present in the fluid.

Since both the primary and secondary electrodes are positioned directly along the predetermined fluid path a maximum contact is provided with the fluid as it bubbles upward through the solution. This aids in decreasing the reaction time, both of the chemical reactions and of the oxidant sensor to changes in concentration in the oxidant.

Further, due to the above described elongated design the oxidant sensor is ideally suited for operation in a minimum amount of electrolytic solution. Preferably, to provide a controlled minimum amount of continuously circulating electrolytic solution adjacent the electrodes, the present invention includes a second or outer tubular member disposed around the first mentioned or inner tubular member. The outer tubular member has an opening in its outer surface adjacent this lower open end. Disposed within the outer tubular member and extending around the inner tubular member is a sleeve member having an opening adjacent its upper end. The upper end of the outer tubular member, as well as that of the sleeve member, is enclosed by a stopper means which is supported by the container. Due to the arrangement of the outer tubular member, the sleeve, and the inner tubular member, the fluid is diffusing through the bubbler and bubbling along the surface of the inner tubular member, passes through the opening in the sleeve member downward to the opening in the outer tubular member and hence upward through the solution through the top of the container. As bubbles escape from the solution, small amounts of solution are, in effect, pumped into the sleeve adjacent the electrodes to maintain a continuous circulation of the electrolytic solution.

The bubbling action also maintains a pressure within the outer tubular member which prevents the level of the solution within the outer tubular member from rising above the upper side of the opening in its outer surface and in turn limits the level of the solution within the sleeve member. Accordingly, by selective positioning of the opening within the outer tubular member, the level of solution adjacent the electrodes is controlled to maintain a minimum amount of solution in contact therewith.

Since the amount of electrolytic solution is maintained at a minimum, the size of the sensor is correspondingly small and extremely lightweight. Also with a small amount of solution adjacent the electrodes the sensor is highly sensitive and responds rapidly to small changes in oxidant concentration. For example, in practice it has been found that an oxidant sensor constructed in accordance with the preferred embodiment of the present invention possesses a rapid linear response to changes in the amount of oxidant present in the fluid over a range of concentration extending from approximately two one-hundredths part per million to pure oxidant.

The above, as well as other features of the present invention, may be more clearly understood by reference to the following detailed description when considered with the drawings, in which:

FIGURE 2 is a cross sectional representation of a preferred form of the oxidant sensor cell structure of the present invention;

Figure 1:
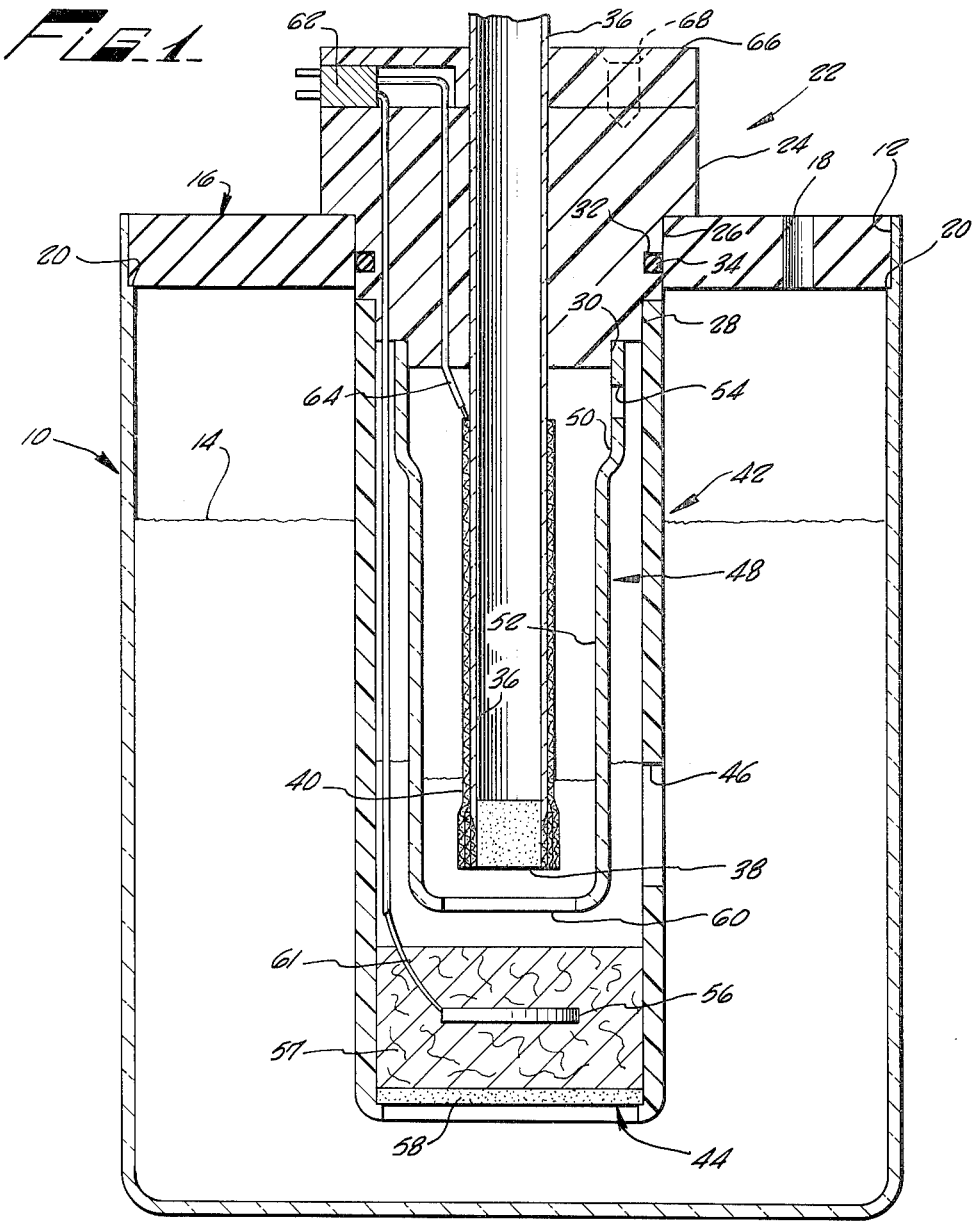
FIGURE 1 is a cross sectional representation of one form of the oxidant sensor of the present invention.

Referring specifically to FIGURE 1, the oxidant sensor of the present invention, in one form, includes a container 10 having an open top 12. Disposed within the container 10 is an electrolytic solution 14 preferably containing ions of a halogen. The composition of the electrolytic solution may be varied depending upon which oxidant is to be detected. For example, if the oxidant to be detected is nitrogen dioxide the solution 14 may be a neutral, aqueous electrolytic solution of sodium iodide with a lithium bromide additive at 80° F. Lithium salts are characterized by high solubility and a high activity coefficient, thereby allowing high effective concentrations of lithium and iodide ions necessary to effect a reaction with nitrogen dioxide. The lithium salts also possess a high conductivity and reduce the surface tension of the solution to improve dispersion of the sample fluid in the solution and allow the fluid to readily foam into uniform contact with the electrode structure of the present invention as will be described hereinafter. In addition, lithium salts are hygroscopic which minimizes water loss and prevents salting up of the bubbler utilized to introduce the oxidant into the solution.

Covering the open top 12 of the container 10 is a cap member 16 having an opening 18 disposed therein. The cap member 16 rests on an annular ridge 20 which extends around the inner circumference of the container 10 to form an airtight seal with the container. The cap member 16 provides support for a stopper member represented generally at 22. The stopper 22 includes four adjacent annular sections 24, 26, 28 and 30 of decreasing radial dimension, in that order. The annular section 24 extends above the cap member 16 and rests thereon. The annular section 26 includes an annular slot 32 and is dimensioned to fit within the cap member 16 to seal the open top of the container 10. Positioned within the annular slot 32 is an O-ring 34 which functions to provide an airtight seal between the stopper 22 and the cap member 16.

Extending downward through the stopper 22 is an inner tubular member 36, preferably composed of a polyethylene type plastic. Disposed within and enclosing an open end of the inner tubular member 36 is a porous bubbler 38. The inner tubular member 36 provides means for introducing a fluid containing unknown amounts of an oxidant, such as nitrogen dioxide, into the solution 14.

Mounted around the bubbler 38 is a primary electrode, represented generally at 40. Preferably the primary electrode takes the form of a wire screen or mesh wound around the porous bubbler 38 and extending upward along the outer surface of the inner tubular member 36. The screen is composed of a noble metal, such as platinum. As represented, the screen is wound a number of times around the porous bubbler 38 while a single wrap of screen extends around the outer surface of the inner tubular member 36.

As will be described in detail hereinafter, the primary electrode 40 functions as a polarized cathode electrode. In particular, by means electrically coupled thereto a potential is applied to the primary electrode 40 which is less than the "hydrogen over-voltage." That is, a negative voltage which is less than that required to liberate hydrogen from the solution yet which polarizes the primary electrode as by the formation of a thin film of hydrogen thereon. The polarization prevents current from flowing between the primary electrode 40 and a secondary or anode electrode which is electrically coupled to the primary electrode 40. The structure hereinabove described in connection with the inner tubular member 36, the bubbler 38, and the primary electrode 40, is common to each of the cell designs of the present invention.

Considering the operation of the polarized electrode 40 in combination with a secondary electrode, to be described hereinafter, when a fluid containing unknown amounts of an oxidant, for example, nitrogen dioxide, is directed downward through the tubular member 36 by means (not shown) the fluid diffuses through the porous bubbler 38. Within the porous bubbler the oxidant cantacts the halide ions, in this case iodide. The oxidant reacts to completion with the solution within the bubbler and that immediately adjacent thereto to oxidize a portion of the iodide to form the halogen, iodine. The iodine then bubbles with the fluid upward along the outer surface of the inner tubular member 36 to define a predetermined fluid path.

In bubbling from the bubbler 38 and foaming upward along the tubular member 36 the fluid and iodine intimately contact the polarized electrode 40. In contacting the polarized electrode, the iodine reacts with the hydrogen film to form hydrogen iodide. In this manner the polarized electrode 40 is depolarized and the iodine converted back to the iodide to allow a current to flow between the first electrode 40 and the secondary electrode. The magnitude of the current flowing between the two electrodes is directly proportional to the amount of halogen formed by the oxidant to depolarize the primary electrode 40. Thus, the magnitude of the current is directly proportional to the amount of oxidant in the fluid introduced into the solution 14.

Due to the mesh construction of the primary electrode along the fluid path, a maximum surface area is provided to react with the fluid. Accordingly, the polarized electrode design in extremely sensitive to the presence of the oxidant and depolarizes rapidly to provide a direct and immediate indication of the amount of oxidant present in the fluid.

Due to the elongated design of the polarized electrode a minimum of electrolytic solution is required to carry out the above described chemical reactions. In practice, since the fluid, in emanating from the bubbler 38, bubbles to the surface of the fluid 14 and then foams upward along the surface of the inner tubular member 36, the level of the electrolytic solution need be only slightly above that of the porous bubbler 38. To provide such an amount of solution on a controlled circulatory basis, the present invention preferably includes an outer tubular member 42 of polyethylene type plastic. The outer tubular member 42 extends around and tightly in contact with the annular section 28 of the stopper 22. In this manner an upper end of the outer tubular member 42 is enclosed by the stopper 22. A lower open end 44 of the outer tubular member 42 extends downward into the solution 14. The outer tubular member 42 also has an opening 46 in its outer surface.

Disposed within the outer tubular member 42 and surrounding the inner tubular member 36 is a sleeve member 48. The sleeve member 48 which may be composed of glass or a polyethylene type plastic includes upper and lower adjacent end sections 50 and 52, respectively. The upper end section 50 possesses a larger cross section than the lower end section 52. The upper end section 50 has an opening 54 in its outer surface and extends around and tightly in contact with the annular section 30 of the stopper 22.

Due to the above described tubular configuration of the oxidant sensor of the present invention, the fluid, in bubbling from the porous bubbler 38, bubbles to the surface of the solution 14 and foams upward along the outer surface of the inner tubular member 36 in contact with the primary electrode 40. In entering the upper end section 50 of the sleeve 48 the fluid is subjected to an increased volume. Accordingly, the bubbles burst and the liquid drips back down into the solution along the inner surface of the sleeve 48 while the fluid, in a gaseous state, escapes through the opening 54 into the compartment defined by the stopper 22, the sleeve 48, and the outer tubular member 42. The fluid then bubbles back into the solution 14, through the opening 46 in the outer tubular member 42, upward through the solution 14, and out of the container 10 through the opening 18 in the cap member 16. Due to this bubbling action a pressure is built up within the compartment the sleeve 48 and the outer tubular member 42 which forces the fluid level to the upper edge of the opening 46. This, in turn, limits the fluid level within the sleeve 48 to that substantially as indicated to maintain a minimum amount of solution adjacent the primary electrode 40. With a minimum of solution adjacent the primary electrode the sensitivity of the sensor is materially increased and the response time of the primary electrode to changes in oxidant concentration substantially reduced.

The bubbling action described above also produces a circulation of the electrolytic fluid in the area of the bubbler 38. In particular, as a bubble is emitted from the surface of the solution 14 and passes from the container through the opening 18 a small amount of fluid passes upward through the open end 44 of the outer tubular member into the sleeve 48 adjacent the bubbler 38. This effects a continuous circulation of the electrolytic solution and maintains the fluid level within the sleeve 48 above the bubbler 38.

As briefly described above, the primary electrode 40 is polarized by the application of a negative potential thereto. Such a negative potential may be produced in one of two manners, namely, by the use of a secondary or anode electrode composed of an active metal immersed in the solution 14 and electrically connected to the first electrode 40, or, by a reference electrode of a noble metal immersed in the solution 14 and connected to the first electrode 40 through a battery. The latter arrangement is illustrated in FIGURE 1 and a schematic representation of the circuit associated therewith in FIGURE 1A.

In the embodiment illustrated in FIGURE 1, the secondary electrode represented at 56 is composed of a noble metal such as platinum and is situated beneath the sleeve 48 within the outer tubular member 42. Preferably, the secondary electrode 56 is positioned within a quantity of activated carbon 57. The carbon may be held in place within the tubular member 42 by a porous plate 58 while the secondary electrode 56 is, in effect, isolated from the primary electrode 40 and sleeve 48 by a porous membrane or a plug 60.

As represented, the secondary electrode 56 is electrically connected by means of an electrical lead 61 to an electrical connector 62. In a similar manner the primary electrode 40 is connected by an electrical lead 64 also to the electrical connector 62. The electrical connector 62 is enclosed by a cap member 66 which is fastened to the stopper member 22 by a screw represented generally at 68.

Figure 1A:
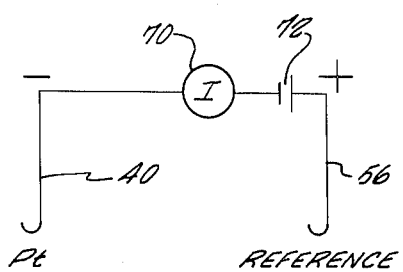
FIGURE 1A is a schematic representation of the circuitry associated with FIGURE 1.

As illustrated in FIGURE 1A, the primary electrode 40 may be electrically coupled to the secondary electrode 56 through an ammeter 70, and a battery 72. The battery 72 is connected such that the secondary electrode 56 is positive relative to the primary electrode 40. In this manner the secondary electrode 56 operates as a reference electrode. The battery 72 generates a voltage less than that required to liberate hydrogen from the solution. Thus, hydrogen ions in the solution in being attracted to the primary electrode form a film of hydrogen thereon to polarize the electrode. With the electrode 40 in a polarized state, current is prevented from flowing between the primary electrode 40 and the secondary electrode 56. When the electrode 40 is depolarized in response to a fluid containing an oxidant being introduced into the fluid 14, a current flows from the reference electrode 56 to the primary electrode 40. This current is directly proportional to the amount of oxidant present in the fluid. Accordingly, the ammeter 70 provides a direct indication of the amount of oxidant present in the fluid, variations in the magnitude of current flow providing a direct indication of changes in the amount of oxidant present in the fluid.

The chemical reaction taking place at the primary electrode 40 is as previously described. At the reference electrode 56 the iodide gives up an electron to form iodine, the electron flowing to the primary electrode 40 to enter into the chemical reaction forming hydrogen iodide. The iodine formed at the reference electrode 56 is absorbed by the carbon 57, thereby preventing iodine from entering into the solution 14. This keeps the outer reservoir of the solution clear of iodine and also prevents iodine, other than that formed in the reaction of the iodide with the nitrogen dioxide in the porous bubbler, from contacting the primary electrode 40, thereby maintaining the direct proportionality between the amount of oxidant present in the fluid and the magnitude of current flow between the primary electrode 40 and the reference electrode 56.

Figures 3, 4:
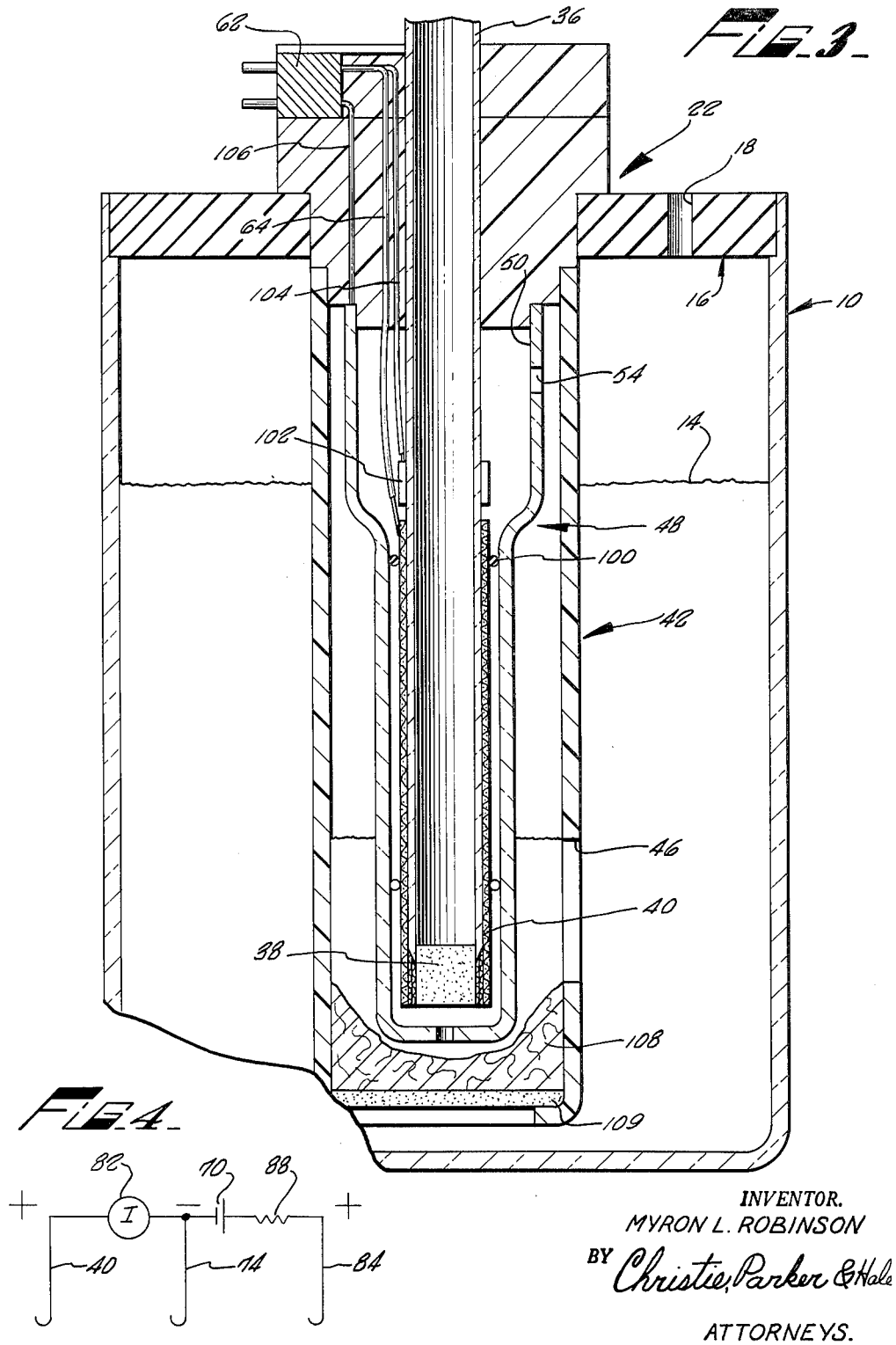
FIGURE 3 is a cross sectional representation of a second preferred embodiment of the oxidant sensor cell of the present invention.
FIGURE 4 is a schematic representation of the electrical circuitry associated with the cell structure represented in FIGURES 2 and 3.

With regard to the first mentioned method of polarizing the primary electrode 40, reference should be made to FIGURES 2, 3 and 4. As mentioned, secondary electrode of an active metal immersed in the electrolytic solution 14 and electrically coupled to the primary electrode external to the solution may be utilized to develop a negative voltage at the electrode 40 which is sufficient to polarize the primary electrode. Preferably, such a secondary electrode, which functions as an anode electrode, is positioned along the predetermined fluid path followed by the fluid in bubbling upward through the solution 14 and foaming along the sides of the inner tubular member 36. As illustrated in FIGURE 2, such an electrode may be provided by a metal strip 74 which is looped under the bubbler 38 and extends upward on either side of the inner tubular member 36. Preferably, the metal strip 74 is composed of an active metal, such as silver, which supplies electrons to the primary electrode and forms an un-ionized reaction product, such as a metal salt, without forming a hydrogen gas. The metal strip is spaced and insulated from the primary electrode 40. To provide such insulation a length of polyethylene cord 76 is laced through the metal strip 74 as indicated.

The metal strip 74 is electrically connected by a lead 78 to the connector 62. The metal strip 74 may be electrically connected to the primary electrode 40 external to the container through an ammeter 82 as indicated in FIGURE 4. The iodide ions in the solution 14 then react with the metal strip 74 to form a metal salt and liberate electrons which travel to the primary electrode 40 to combine with hydrogen ions present in the solution to form a film of hydrogen on the primary electrode. In this manner a small voltage of less than one volt is supplied to polarize the primary electrode 40.

As previously described, when a fluid containing an oxidant is introduced into the inner tubular member 36, the oxidant reacts with the iodide ions within the bubbler 38 to form iodine which, in turn, bubbles with the fluid immediately into contact with the primary electrode 40. The iodine, in contacting the primary electrode, reacts with the hydrogen film, thereby depolarizing the primary electrode 40 to form hydrogen iodide.

The iodide, in solution, bubbles with the fluid upward along the surface of the inner tubular member 36 in contact with the metal strip 74. At the metal strip 74 the iodide combines with the silver of the strip to form a silver salt and an electron. The electron travels to the primary electrode 40 to enter into the reaction thereat in the formation of hydrogen. In this manner a current flows between the primary electrode 40 and the metal strip 74 and through the ammeter 82 which is directly proportional to the amount of iodine contacting the electrode 40 to depolarize the film of hydrogen thereon and hence is directly proportional to the amount of oxidant in the fluid reacting with the iodide within the bubbler 38.

As described in connection with FIGURE 1, the elongated cell design of the present invention lends itself to operation on a minimum amount of electrolytic solution. In this regard the tubular structure described in FIGURE 1 is ideally suited to use in the sensor designs of FIGURES 2 and 3 as indicated. By employing such a tubular design the electrolytic solution is maintained at a given level adjacent the bubbler 38 and is effectively circulated adjacent the primary and secondary electrodes to provide a rapid response time to extremely small changes in oxidant concentration over a wide range of values.

As described above, in the chemical reaction at the metal strip 74 a metal salt is formed thereon. In the case of a silver metal strip, after a period of use silver iodide is deposited on the metal strip 74. This increases the impedance to current flow between the primary electrode 40 and the metal strip 74. Accordingly, it is desired to provide means for keeping the metal strip 74 clean of the metal salt. This may be accomplished in a number of ways. For example, complexing, sequestering or chelating agents may be added to the solution to prevent the depositing of the metal salt. Preferably, however, a metal salt is prevented from forming on the metal strip 74 by employing a third electrode along the predetermined fluid path.

In the embodiment illustrated in FIGURE 2, this is accomplished with a second metal strip 84. The metal strip 84, like the metal strip 74, is looped under the bubbler 38 and is spaced from the primary electrode 40 as well as the secondary electrode 74. The spacing, as well as insulation for the third electrode 84, is provided by a cord of polyethylene type plastic 86 which is looped through the third electrode 84 as represented. The third electrode 84 is electrically coupled by the lead 87 to the electrical connector 62. As illustrated in the schematic drawing of FIGURE 4, the third electrode 84 may be electrically connected to the secondary electrode through a resistor 88 and a battery 90. The battery 90 generates voltage of the order of fifteen millivolts and maintains the third electrode 84 positive relative to the secondary electrode during periods of little or no oxidant sensing.

Thus, the metal salt forms mostly on the third electrode 84 and the secondary electrode is kept in a condition to supply high currents required when the oxidant level is high. In the preferred form, resistor 88 is kept low so that when the secondary electrode does not become coated, the current flowing from the third electrode automatically increases to hasten transfer of the metal salt coating off of the secondary electrode.

With use, iodine builds up in the outer reservoir. As described in connection with FIGURE 1, it is desired to prevent such iodine from entering into the electrode area to disturb the proportionality between the amount of oxidant in the fluid and the magnitude of the current passing between the primary and secondary electrodes. In the embodiment illustrated in FIGURE 2, this is prevented by a plug arrangement, indicated generally at 92, which is disposed in the lower open end of the sleeve 48. The plug arrangement preferably includes a rod 94 of an active metal such as silver which is surrounded by a wire mesh 96 of a noble metal, such as platinum. The metal rod 94 and the wire mesh 96 are electrically connected together as illustrated by the lead 98. At the metal rod 94, iodide ions in solution combine with the metal to form the metal salt and liberate an electron. At the wire mesh 96, the iodine from the outer solution combines with the electron to form an iodide ion. In this manner any solution passing through the plug arrangement 92 is freed of iodine.

As indicated above, it is preferred that the secondary electrode be composed of the active metal and provide a maximum surface area for contacting the bubbling fluid and solution. An embodiment particularly designed to accomplish this is illustrated in FIGURE 3, wherein the sleeve member 48 itself is composed of an active metal, such as silver. The sleeve is insulated from the first electrode 40 by polyethylene spacers, such as indicated at 100.

With the sleeve 48 composed of an active metal, the fluid, in bubbling from the bubbler and passing upward through the solution, continuously contacts the inner surface of the secondary electrode until it passes through the opening 54 and out of the outer tubular member 42 through the opening 46. Accordingly, the reaction at the secondary electrode to form a metal salt and an electron is maximized in the embodiment illustrated in FIGURE 3.

In order to prevent the metal salt from plating on the inner surface of the sleeve 48 and thereby impeding current flow between the primary electrode 40 and the secondary electrode, comprising the sleeve 48, a third electrode 102 in the form of a ring of an active metal is mounted around the outer surface of the inner tubular member 36 just above the primary electrode. By so positioning the third electrode 102 in the predetermined fluid path, the fluid, in bubbling with the solution upward along the outer surface of the inner tubular member 36, contacts the third electrode 102.

The electrode 102 is electrically coupled as indicated by the lead 104 to the electrical connector 62 while the sleeve member 48 is electrically connected thereto by a lead indicated at 106. By circuit means external to the container 10, a circuit arrangement such as illustrated schematically in FIGURE 4 may be produced with the third electrode being maintained slightly positive relative to the secondary electrode.

In this manner the chemical and electrical reactions occuring in the embodiment of FIGURE 3 are substantially as described in the connection with FIGURE 2. Thus, electrons are drawn from the secondary electrode to prevent the formation of a metal salt on the sleeve 48. Instead, the metal salts are plated on the third electrode 102 in response to the fluid and solution bubbling into contact therewith. Accordingly, a low impedance current path is maintained between the primary and secondary electrodes to provide a current flow therebetween which is directly proportional to the amount of oxidant contained in the fluid bubbled through the solution.

As previously described, iodine forms in the outer solution through use of the cell structure. To prevent the iodine from entering into the sleeve 48 the embodiment of the present invention illustrated in FIGURE 3 includes a quantitiy of activated carbon 108 disposed at the open end of the tubular member 42. The carbon is supported within the tubular member 42 by a porous member 109 and functions to absorb the iodine from the solution. This prevents iodine from passing from without the sleeve 48 into contact with the electrode assembly of the present invention.

The oxidant sensor of the present invention may be conditioned to detect particular oxidants. Thus, as described, when it is desired to sense nitrogen dioxide a neutral solution of lithium iodide is preferred. Further, the primary electrode 40 is provided with a non-catalytic surface. This may be accomplished by utilizing an impure noble metal or by conditioning the primary electrode by placing it in a salt solution and applying a current thereto for a short period of time. Further, the temperature of the solution is maintained substantially at room temperature. However, when it is desired to detect the oxygen the pH of the solution is lowered, making it strongly acid. The concentration of the halide ions in the electrolyte is also materially increased and in such an instance the primary electrode preferably has a catalytic surface while the temperature is materially increased over that utilized in the detection of nitrogen dioxide.

What is claimed is:

1. An oxidant sensor comprising:
   an open container having a reactive electrolytic solution of halide ions disposed therein;
   a cap member supported by said container;
   an outer tubular member having an upper end coupled to and enclosed by said cap member and having a lower end extending downward into said solution, said outer tubular member having an opening in its outer surface adjacent said open lower end;
   a sleeve member having an upper end coupled to and enclosed by said cap member to extend a lower end downward into said container, said sleeve member being positioned laterally within said outer tubular member, said sleeve member having upper and lower end sections, said upper end section having a greater cross section than said lower end section, said upper end section having an opening in its outer surface;
   an inner tubular member extending through said cap member and extending downwardly into said container within said sleeve member for first bubbling a fluid containing unknown amounts of a primary oxidant into said reactive solution and then upward along said outer surface thereof to define a predetermined fluid path whereby said primary oxidant in contacting said solution reacts to completion with said halide ions to generate the corresponding halogen as an intermediate oxidant which bubbles with said fluid along said predetermined path;
   a cathode electrode of a noble metal unreactive with said electrolytic solution, said cathode being partially immersed in said solution and mounted upon the outer surface of said inner tubular member in said predetermined fluid path;
   and means including an anode electrode closely adjacent said cathode and immersed in said solution for polarizing said cathode electrode such that said cathode electrode is depolarized in response to said fluid containing said intermediate oxidant, thereby allowing a current to flow between said cathode and anode electrodes in direct proportion to said amount of primary oxidant originally present in said fluid.

2. Said apparatus defined in claim 1 wherein said anode electrode is mounted in said fluid path spaced and insulated from said cathode electrode.

3. In an oxidant sensor including an open container having a reactive electrolytic solution of halide ions disposed therein, the combination comprising:
   a cap member supported by said container;
   an outer tubular member having an upper end coupled to and enclosed by said cap member and having a lower open end extending downward into said solution, said outer tubular member having an opening in its outer surface adjacent said lower open end;
   a sleeve member having an upper end coupled to and enclosed by said cap member to extend a lower open end downward into said container, said sleeve member being positioned laterally within said outer tubular member, said sleeve member having upper and lower ends sections, said upper end section having a greater cross section than said lower end section, said upper end section having an opening in its outer surface;
   an inner tubular member extending through said cap member and having an open end extending downward into said container within said sleeve member for introducing a fluid containing unknown amounts of a primary oxidant into said reactive solution;
   a porous bubbler immersed in said solution and enclosing the open end of said inner tubular member such that said fluid diffuses through said bubbler and bubbles upward through said reactive solution along said outer surface of said inner tubular member whereby said primary oxidant in contacting said solution reacts to completion with said halide ions to generate the corresponding halogen as an intermediate oxidant which bubbles with said fluid and along said predetermined path;
   a cathode wire mesh of noble metal unreactive with said solution wrapped around said bubbler and extending upward along said outer surface of said inner tubular member;
   an anode strip of an active metal looped under said bubbler and extending upward on either side of said inner tubular member;
   electrical circuit means connecting said mesh and said metal strip such that said wire mesh is polarized and in response to said intermediate fluid containing said oxidant being bubbled through the bubbler is depolarized to allow a current to flow between said mesh and said metal strip in direct proportion to the amount of primary oxidant originally present in said fluid.

4. Said apparatus defined in claim 3 including a second metal strip looped under said bubbler and extending upward on either side of said inner tubular member, said second metal strip being spaced from said first mentioned metal strip and said wire mesh and electrical circuit means including a battery coupled between said first mentioned metal strip and said said second metal strip such that said second metal strip is positive relative to said first mentioned metal strip.

5. In an oxidant sensor, the combination comprising:
   a container having a reactive electrolytic solution of halide ions therein;
   a tubular member having inner and outer surfaces and an open end extending into said solution for introducing a fluid containing unknown amounts of a primary oxidant into said solution;
   a bubbler enclosing said open end of said tubular member such that said fluid must diffuse through said bubbler and bubble upward along said tubular member whereby said primary oxidant in contacting said solution reacts to completion with said halide ions to generate the corresponding halogen as an intermediate oxidant which bubbles with said fluid upward along said tubular member;
   a cathode electrode of a noble metal which does not react with said electrolytic solution wound around the outer surface of said bubbler and said tubular member;
   means including an anode electrode immersed in said solution closely adjacent said cathode and connected to said cathode electrode external to said solution for polarizing said cathode electrode such that said cathode electrode is depolarized in response to said fluid containing said oxidant being bubbled through said bubbler, thereby allowing a current to flow between said cathode and anode electrodes in direct proportion to the amount of oxidant in said fluid;

a sleeve member positioned around said tubular member, said sleeve member having a lower open end;

and means disposed in said lower open end of said sleeve member below said bubbler for keeping any halogen from entering with said solution through said lower open end of said sleeve member into contact with said cathode electrode, said means including a rod of an active metal encircled by a mesh of a noble metal which is electrically coupled to said rod.

6. An oxidant sensor as set forth in claim 1, wherein said cathode electrode is in the form of a wire mesh and said anode electrode is in the form of a sleeve of an active metal spaced around the outer surface of said tubular member.

7. An oxidant sensor as set forth in claim 1, including a quantitiy of activated carbon positioned within said sleeve member adjacent the lower end thereof for preventing any halogen from entering through said lower open end of said sleeve member into contact with said cathode electrode.

References Cited by the Examiner
UNITED STATES PATENTS

| | | | |
|---|---|---|---|
| 2,624,701 | 1/1953 | Austin | 204—195 |
| 2,651,612 | 9/1953 | Haller | 204—195 |
| 2,745,804 | 5/1956 | Shaffer | 204—195 |
| 2,805,191 | 9/1957 | Hersch | 204—1.1 |
| 2,851,655 | 9/1958 | Haddad | 204—195 |
| 2,898,282 | 8/1959 | Flook et al. | 204—195 |
| 2,939,827 | 6/1960 | Jacobson et al. | 204—195 |
| 2,943,028 | 6/1960 | Thayer et al. | 204—1.1 |
| 3,022,241 | 2/1962 | Jessop | 204—195 |
| 3,028,317 | 4/1962 | Wilson et al. | 204—195 |
| 3,038,848 | 6/1962 | Brewer et al. | 204—195 |
| 3,088,905 | 5/1963 | Glover | 204—195 |

JOHN H. MACK, *Primary Examiner.*

JOHN R. SPECK, MURRAY TILLMAN, WINSTON A. DOUGLAS, *Examiners.*